US010422063B2

(12) United States Patent
Yu et al.

(10) Patent No.: US 10,422,063 B2
(45) Date of Patent: Sep. 24, 2019

(54) METHOD FOR PREPARING HOLLOW TEXTILE WITH CORE-SPUN YARN OF SHORT-STAPLE WRAPPED MICROPOROUS ALKALI-SOLUBLE POLYESTER FILAMENT

(71) Applicants: Yanping Yu, Shanghai (CN); Weiguo Liu, Shandong (CN); Erqi Yu, Shanghai (CN); Junhe Liu, Shandong (CN)

(72) Inventors: Yanping Yu, Shanghai (CN); Weiguo Liu, Shandong (CN); Erqi Yu, Shanghai (CN); Junhe Liu, Shandong (CN)

( * ) Notice: Subject to any disclaimer, the term of this patent is extended or adjusted under 35 U.S.C. 154(b) by 123 days.

(21) Appl. No.: 15/708,161

(22) Filed: Sep. 19, 2017

(65) Prior Publication Data

US 2019/0062974 A1 Feb. 28, 2019

(30) Foreign Application Priority Data

Aug. 23, 2017 (CN) .......................... 2017 1 0731021

(51) Int. Cl.

| | |
|---|---|
| ***D06C 19/00*** | (2006.01) |
| ***C08G 63/19*** | (2006.01) |
| ***D02G 3/36*** | (2006.01) |
| ***D01F 8/14*** | (2006.01) |
| ***D01H 1/02*** | (2006.01) |
| ***D01D 1/04*** | (2006.01) |
| ***D01F 6/62*** | (2006.01) |
| ***D03D 15/00*** | (2006.01) |

(52) U.S. Cl.

CPC ............. *D06C 19/00* (2013.01); *C08G 63/19* (2013.01); *D01D 1/04* (2013.01); *D01F 6/62* (2013.01); *D01F 8/14* (2013.01); *D01H 1/02* (2013.01); *D02G 3/36* (2013.01); *D03D 15/00* (2013.01)

(58) Field of Classification Search

CPC .......... D06C 19/00; C08G 63/19; D01D 1/04; D01F 6/62; D01F 8/14; D01H 1/02; D02G 3/36; D03D 15/00; B29C 48/05; B29C 48/2886; B29C 64/118; B29C 65/5028; B29C 65/5035; B29C 66/69; B29C 70/30; B29C 70/38; B29C 45/14549; B29C 2045/14557; B29C 45/14598; B29C 51/006; B29C 70/10

See application file for complete search history.

*Primary Examiner* — Stella K Yi

(57) ABSTRACT

The invention discloses a method for preparing a hollow textile with a core-spun yarn of short-staple wrapped microporous alkali-soluble polyester filament, which includes a foaming microcapsule preparation step, a preparation step of alkali-soluble chips containing foaming microcapsules, a melt foaming and spinning step, and a hollow textile preparation step. In the method for preparing the hollow textile with the core-spun yarn of short-staple wrapped microporous alkali-soluble polyester filament, a hollow yarn or a hollow fabric is made from a polyester filament having a microporous structure through alkali dissolution. The polyester filament having a microporous structure can effectively increase the contact area of the alkali dissolution and has the advantages of high dissolution rate, short dissolution time and complete dissolution. The hollow textile prepared from the hollow yarn or the hollow fabric obtained after dissolution has a comfortable hand feeling and has the characteristics of being fluffy, soft, warm and quick-drying.

8 Claims, 1 Drawing Sheet short-staple microporous alkali-soluble polyester filament

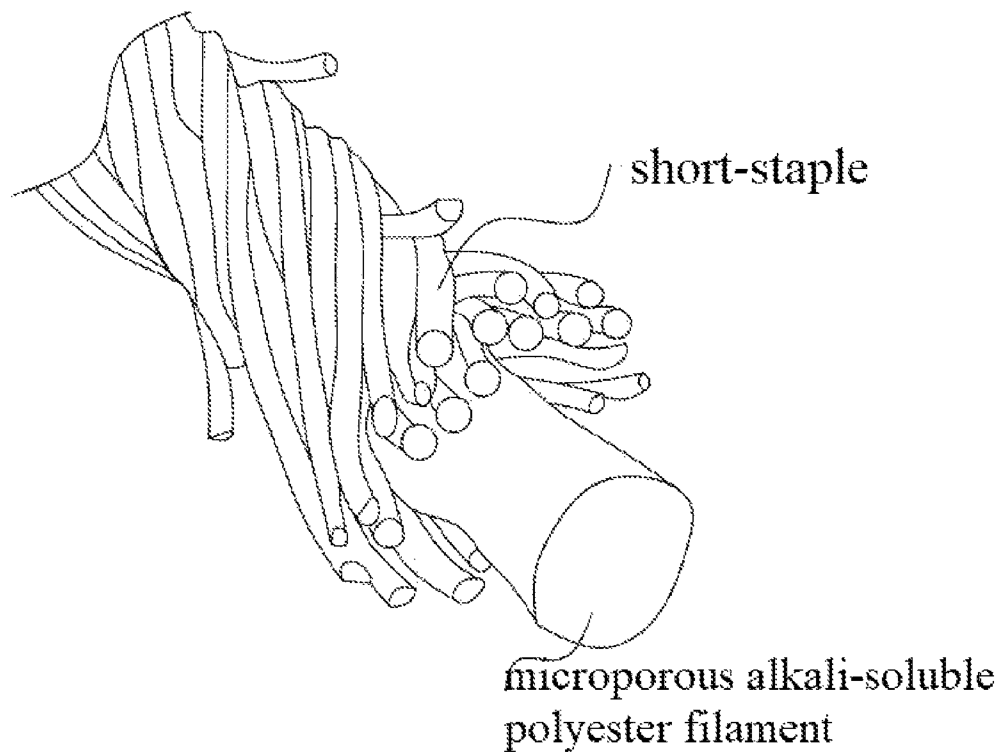
short-staple
microporous alkali-soluble
polyester filament

METHOD FOR PREPARING HOLLOW TEXTILE WITH CORE-SPUN YARN OF SHORT-STAPLE WRAPPED MICROPOROUS ALKALI-SOLUBLE POLYESTER FILAMENT

BACKGROUND OF THE INVENTION

The present invention relates to the field of textile preparation technology and, more particularly, to a method for preparing a hollow textile with a core-spun yarn of short-staple wrapped microporous alkali-soluble polyester filament.

The textile is required to excel in comfort and functionality. Comfort involves hand feeling comfort (such as fluffy and soft) and heat and moisture transfer comfort (such as moisture absorption and sweat releasing, warmth retention and other functions). Bulked yarn, wool or machine impact process are commonly used to obtain the fluffiness (such as using high-speed airflow impact to make the textile fluffy), but the machine impact will damage the appearance and mechanical properties of the textile. Soft fibers (fine-denier fibers) or chemical softening agents are commonly used to obtain softness, but chemical additives will lead to washability problems. Fibers with good heat retention property (hollow synthetic fibers) or fabrics with an air layer are commonly used to obtain warmth. The water absorption and quick drying property can be achieved by adopting moisture absorbing and quick drying synthetic fibers and by adding hydrophilic substances. However, this approach is only applicable for synthetic fibers, not for natural fibers.

Thus, the above is about obtaining a single function, or using special fibers, or a special single post-treatment approach to achieve a single index.

BRIEF SUMMARY OF THE INVENTION

In view of the deficiencies of the prior art, the present invention aims to provide a method for preparing a hollow textile with a core-spun yarn of short-staple wrapped microporous alkali-soluble polyester filament. In the method for preparing the hollow textile with the core-spun yarn of short-staple wrapped microporous alkali-soluble polyester filament, a hollow yarn or a hollow fabric is made from a polyester filament having a microporous structure through alkali dissolution. The polyester filament having the microporous structure can effectively increase the contact area of the alkali dissolution and has the advantages of high dissolution rate, short dissolution time and complete dissolution. The hollow textile prepared from the hollow yarn or the hollow fabric obtained after dissolution has a comfortable hand feeling and has the characteristics of being fluffy, soft, warm and quick-drying.

To achieve the above object, the present invention is realized by using the following technical solution.

A method for preparing a hollow textile with a core-spun yarn of short-staple wrapped microporous alkali-soluble polyester filament, comprising the following processing steps:

a. Preparation of Foaming Microcapsules:

a1. Dimethyl terephthalate, ethylene glycol, sodium dimethyl isophthalate-5-sulfonate, polyethylene glycol and tetrabutyl titanate are placed in a pulp vessel and mixed well to obtain a raw material for a microcapsule wall material, wherein the parts by weight of the dimethyl terephthalate, the ethylene glycol, the sodium dimethyl isophthalate-5-sulfonate, the polyethylene glycol and tetrabutyl titanate are:

Dimethyl terephthalate, 60%-75%;
Ethylene glycol, 5%-15%;
Sodium dimethyl isophthalate-5-sulfonate, 2%-15%;
Polyethylene glycol, 2%-10%;
Tetrabutyl titanate, 0.4%-1.3%;

a2. The raw material for the microcapsule wall material after the mixing in a1 is transferred into an esterification vessel for esterification reaction at a temperature of 220° C.-260° C. for 2-3 hours;

a3. The raw material for the microcapsule wall material after the esterification reaction in a2 is transferred into a polycondensation vessel for polycondensation reaction at a temperature of 250° C.-280° C. for 1-2 hours. The degree of vacuum inside the polycondensation vessel during the polycondensation reaction is 30 pa-80 pa;

a4. The raw material for the microcapsule wall material after the polycondensation reaction in a3 is fed into a granulator to produce microcapsule wall material chips with a melting point of 250° C.-258° C.;

a5. An alkane foaming agent is selected as a core material of the microcapsule, which, together with the microcapsule wall material chips obtained in a4, is used to prepare the foaming microcapsule through in-situ polymerization. The foaming microcapsule has a particle size of 5 μm-15 μm, and the parts by weight of the wall and core materials of the microcapsule are:

Wall material of the microcapsule, 80%-85%;
Core material of the microcapsule, 15%-20%;

b. Preparation of Alkali-Soluble Chips Containing Foaming Microcapsules b1 Dimethyl terephthalate, ethylene glycol, sodium dimethyl isophthalate-5-sulfonate, diethylene glycol and tetrabutyl titanate are placed in a pulp vessel and mixed well to obtain a raw material for the alkali-soluble chips, wherein the parts by weight of the dimethyl terephthalate, the ethylene glycol, the sodium dimethyl isophthalate-5-sulfonate, the diethylene glycol and the tetrabutyl titanate are:

Dimethyl terephthalate, 50%-65%;
Ethylene glycol, 15%-25%;
Sodium dimethyl isophthalate-5-sulfonate, 5%-20%;
Diethylene glycol, 2%-10%;
Tetrabutyl titanate, 0.5%-1.2%;

b2. The raw material for the alkali-soluble chips after the mixing in b1 is transferred into an esterification vessel for esterification reaction at a temperature of 200° C.-260° C. for 2-3 hours;

b3. The raw material for the alkali-soluble chips after the esterification reaction in b2 is transferred into a polycondensation vessel for polycondensation reaction at a temperature of 250° C.-280° C. for 1-2 hours. The degree of vacuum inside the polycondensation vessel during the polycondensation reaction is 30 pa-80 pa;

b4. After the polycondensation reaction, the vacuum is removed to allow the pressure inside the polycondensation vessel to be equal to the atmospheric pressure, and the raw material for the alkali-soluble chips is cooled to 220° C.-240° C.; the foaming microcapsules prepared in a5 are then added to the polycondensation vessel and mixed uniformly with the raw material for the alkali-soluble chips, wherein the added foaming microcapsules are 1%-10% by weight of the raw material for the alkali-soluble chips;

b5. The raw material for the alkali-soluble chips containing foaming microcapsules and mixed uniformly in the polycondensation vessel is fed into a granulator to produce alkali-soluble chips containing foaming microcapsules and having a melting point of 220° C.;

c. Melt Foaming and Spinning:

c1. The alkali-soluble chips containing foaming microcapsules are fed into a dryer to be subjected to pre-crystallization and drying processes in sequence for pre-crystallization and drying treatment, after which the water content of the alkali-soluble chips is required to be less than 50 ppm; the temperature and time for the pre-crystallization process are 110° C.-130° C. and 10-30 minutes respectively, and the temperature and time for the drying process are 120° C.-150° C. and 10-15 hours, respectively;

c2. The alkali-soluble chips after the pre-crystallization and drying treatment are transferred into a screw extruder for spinning. A melt barrel of the screw extruder is provided with a first heating zone, a second heating zone, a third heating zone, a fourth heating zone, a fifth heating zone and a sixth heating zone arranged in this order along an extrusion direction, with the temperature at each heating zone being 275° C., 285° C., 285° C., 280° C., 280° C. and 280° C., respectively. The alkali-soluble chips flow through the first heating zone, the second heating zone, the third heating zone, the fourth heating zone, the fifth heating zone and the sixth heating zone as a result of being driven by the screw, during which the alkali-soluble chips are melted, the wall material of the foaming microcapsule is melted, and the alkane foaming agent is foamed. Under the extrusion of the screw, the alkali-soluble chips form a melt having closed and dispersed microbubbles, which forms an alkali-soluble polyester filament having a microporous structure at a spinning speed of 1000-3500 m/min and a draft ratio of 3.0-3.8;

d. Preparation of Hollow Textiles:

d1. The core-spun yarn of short-staple wrapped microporous alkali-soluble polyester filament is prepared according to the method of core-spun yarn spinning. The wrapping of the core-spun yarn is natural short fiber or chemical short fiber, and the core of the core-spun yarn is the microporous alkali-soluble polyester filament. The spinning method for the above core-spun yarn is ring spinning, siro spinning, friction spinning or vortex spinning;

d2. The core-spun yarn of short-staple wrapped microporous alkali-soluble polyester filament is put into the NaOH solution for alkali dissolution treatment. The NaOH solution contacts and dissolves the microporous alkali-soluble polyester filament, and the microporous structure of the microporous alkali-soluble polyester filament increases the contact area. After dissolution of the microporous alkali-soluble polyester filament, the core-spun yarn of short-staple wrapped microporous alkali-soluble polyester filament forms a hollow yarn with a complete hollow structure, and the hollow yarn is woven into a cloth to achieve hollow textile preparation.

Alternatively, the core-spun yarn of short-staple wrapped microporous alkali-soluble polyester filament can be first woven into a cloth to obtain a core-spun yarn fabric, which is then put into the NaOH solution for alkali dissolution treatment. The NaOH solution contacts and dissolves the microporous alkali-soluble polyester filament, and the microporous structure of the microporous alkali-soluble polyester filament increases the contact area. After the dissolution of the microporous alkali-soluble polyester filament, the core-spun yarn fabric forms a hollow spun fabric to achieve hollow textile preparation.

The alkane foaming agent is butane, isobutane or pentane.

The microcapsule wall chips obtained in a4 have an intrinsic viscosity of 0.65-0.75.

The alkali-soluble chips obtained in a5 have an intrinsic viscosity of 0.55-0.65.

The microporous alkali-soluble polyester filament obtained in c2 has a fiber strength of 2.5-3.5 cn/dtex, and an elongation at break of 20%-40%.

The parts by weight of the dimethyl terephthalate, the ethylene glycol, the sodium dimethyl isophthalate-5-sulfonate, the polyethylene glycol and the tetrabutyl titanate in the raw material for the microcapsule wall material in a1 are:

Dimethyl terephthalate, 70%;

Ethylene glycol, 15%;

Sodium dimethyl isophthalate-5-sulfonate, 10%;

Polyethylene glycol, 4.3%;

Tetrabutyl titanate, 0.7%;

In a2, the esterification reaction is carried out at a temperature of 260° C. for 2 hours;

In a3, the polycondensation reaction is carried out at a temperature of 280° C. for 2 hours; the degree of vacuum inside the polycondensation vessel during the polycondensation reaction is 50 pa;

In a4, the microcapsule wall chips have a melting point of 258° C., and an intrinsic viscosity of 0.70;

In a5, isobutane is selected as the core material of the microcapsule; the foaming microcapsule has a particle size of 10 μm, and the parts by weight of the wall and core materials of the foaming microcapsule are:

Wall material of the microcapsule, 80%;

Core material of the microcapsule, 20%;

The parts by weight of the dimethyl terephthalate, the ethylene glycol, the sodium dimethyl isophthalate-5-sulfonate, the diethylene glycol and the tetrabutyl titanate in the raw material for the alkali-soluble chips in b1 are:

Dimethyl terephthalate, 60%;

Ethylene glycol, 20%;

Sodium dimethyl isophthalate-5-sulfonate, 14%;

Diethylene glycol, 5%;

Tetrabutyl titanate, 1%;

In b2, the esterification reaction is carried out at a temperature of 250° C. for 2 hours;

In b3, the polycondensation reaction is carried out at a temperature of 280° C. for 2 hours; the degree of vacuum inside the polycondensation vessel during the polycondensation reaction is 50 pa;

In b4, after the polycondensation reaction, the vacuum is removed to allow the pressure inside the polycondensation vessel to be equal to the atmospheric pressure, and the raw material for the alkali-soluble chips is cooled to 240° C.; the foaming microcapsules are then added to the polycondensation vessel and mixed uniformly with the raw material for the alkali-soluble chips; the parts by weight of the raw material for the alkali-soluble chips and the foaming microcapsule are:

Raw material for the alkali-soluble chips, 95%;

Foaming microcapsules, 5%;

In b5, the alkali-soluble chips have a melting point of 220° C., and an intrinsic viscosity of 0.58.

The water content of the alkali-soluble chips after the pre-crystallization and drying treatment is required to be less than 20 ppm; the temperature and time for the pre-crystallization process are 130° C. and 30 minutes, respectively, and the temperature and time for the drying process are 130° C. and 12 hours, respectively;

In c2, the melt having closed and dispersed microbubbles forms an alkali-soluble polyester filament having a microporous structure at a spinning speed of 3500 m/min and a draft ratio of 3.5; the microporous alkali-soluble polyester filament is a 50 D/24F FDY filament with a fiber strength of 2.8 cn/dtex, and an elongation at break of 25%.

Advantageous effects of the present invention are as follows: the method for preparing the hollow textile with the core-spun yarn of short-staple wrapped microporous alkali-soluble polyester filament includes the foaming microcapsule preparation step, the preparation step of alkali-soluble chips containing foaming microcapsules, the melt foaming and spinning step, and the hollow textile preparation step. In the method for preparing the hollow textile with the core-spun yarn of short-staple wrapped microporous alkali-soluble polyester filament, the hollow yarn or the hollow fabric is made from the polyester filament having the microporous structure through alkali dissolution. The polyester filament having the microporous structure can effectively increase the contact area of the alkali dissolution and has the advantages of high dissolution rate, short dissolution time and complete dissolution. The hollow textile prepared from the hollow yarn or the hollow fabric obtained after dissolution has a comfortable hand feeling and has the characteristics of being fluffy, soft, warm and quick-drying.

BRIEF DESCRIPTION OF THE DRAWINGS

The invention will now be described in further detail with reference to the drawings, but the embodiments in the drawings are not to be construed as limiting the invention.

FIG. 1 is a structural diagram of a core-spun yarn of short-staple wrapped microporous alkali-soluble polyester filament.

DETAILED DESCRIPTION OF THE INVENTION

The present invention will now be described with reference to specific embodiments.

A method for preparing a hollow textile with a core-spun yarn of short-staple wrapped microporous alkali-soluble polyester filament, comprising the following process steps:

a. Preparation of foaming microcapsules:

a1. Dimethyl terephthalate, ethylene glycol, sodium dimethyl isophthalate-5-sulfonate, polyethylene glycol and tetrabutyl titanate are placed in a pulp vessel and mixed well to obtain a raw material for a microcapsule wall material, wherein the parts by weight of the dimethyl terephthalate, the ethylene glycol, the sodium dimethyl isophthalate-5-sulfonate, the polyethylene glycol and tetrabutyl titanate are:

Dimethyl terephthalate, 60%-75%;

Ethylene glycol, 5%-15%;

Sodium dimethyl isophthalate-5-sulfonate, 2%-15%;

Polyethylene glycol, 2%-10%;

Tetrabutyl titanate, 0.4%-1.3%;

a2. The raw material for the microcapsule wall material after the mixing in a1 is transferred into an esterification vessel for esterification reaction at a temperature of 220° C.-260° C. for 2-3 hours;

a3. The raw material for the microcapsule wall material after the esterification reaction in a2 is transferred into a polycondensation vessel for polycondensation reaction at a temperature of 250° C.-280° C. for 1-2 hours; the degree of vacuum inside the polycondensation vessel during the polycondensation reaction is 30 pa-80 pa;

a4. The raw material for the microcapsule wall material after the polycondensation reaction in a3 is fed into a granulator to produce microcapsule wall chips with a melting point of 250° C.-258° C. and an intrinsic viscosity of 0.65-0.75;

a5. An alkane foaming agent (butane, isobutane or pentane) is selected as a core material of the microcapsule, which, together with the microcapsule wall chips obtained in a4, is used to prepare the foaming microcapsule through in-situ polymerization. The foaming microcapsule has a particle size of 5 μm-15 μm, and the parts by weight of the wall and core materials of the microcapsule are:

Wall material of the microcapsule, 80%-85%;

Core material of the microcapsule, 15%-20%;

b. Preparation of alkali-soluble chips containing foaming microcapsules b1. Dimethyl terephthalate, ethylene glycol, sodium dimethyl isophthalate-5-sulfonate, diethylene glycol and tetrabutyl titanate are placed in a pulp vessel and mixed well to obtain a raw material for the alkali-soluble chips, wherein the parts by weight of the dimethyl terephthalate, the ethylene glycol, the sodium dimethyl isophthalate-5-sulfonate, the diethylene glycol and the tetrabutyl titanate are:

Dimethyl terephthalate, 50%-65%;

Ethylene glycol, 15%-25%;

Sodium dimethyl isophthalate-5-sulfonate, 5%-20%;

Diethylene glycol, 2%-10%;

Tetrabutyl titanate, 0.5%-1.2%;

b2. The raw material for the alkali-soluble chips after the mixing in b1 is transferred into an esterification vessel for esterification reaction at a temperature of 200° C.-260° C. for 2-3 hours;

b3. The raw material for the alkali-soluble chips after the esterification reaction in b2 is transferred into a polycondensation vessel for polycondensation reaction at a temperature of 250° C.-280° C. for 1-2 hours. The degree of vacuum inside the polycondensation vessel during the polycondensation reaction is 30 pa-80 pa;

b4. After the polycondensation reaction, the vacuum is removed to allow the pressure inside the polycondensation vessel to be equal to the atmospheric pressure, and the raw material for the alkali-soluble chips is cooled to 220° C.-240° C.; the foaming microcapsules prepared in a5 are then added to the polycondensation vessel and mixed uniformly with the raw material for the alkali-soluble chips, wherein the added foaming microcapsules are 1%-10% by weight of the raw material for the alkali-soluble chips;

b5. The raw material for the alkali-soluble chips containing foaming microcapsules and mixed uniformly in the polycondensation vessel is fed into a granulator to produce alkali-soluble chips containing foaming microcapsules and having a melting point of 220° C. and an intrinsic viscosity of 0.55-0.65;

c. Melt foaming and spinning:

c1. The alkali-soluble chips containing foaming microcapsules are fed into a dryer to be subjected to pre-crystallization and drying processes in sequence for pre-crystallization and drying treatment, after which the water content of the alkali-soluble chips is required to be less than 50 ppm; the temperature and time for the pre-crystallization process are 110° C.-130° C. and 10-30 minutes, respectively, and the temperature and time for the drying process are 120° C.-150° C. and 10-15 hours, respectively;

c2. The alkali-soluble chips after the pre-crystallization and drying treatment are transferred into a screw extruder for spinning. A melt barrel of the screw extruder is provided with a first heating zone, a second heating zone, a third heating zone, a fourth heating zone, a fifth heating zone, and a sixth heating zone arranged in this order along an extrusion direction, with the temperature at each heating zone being 275° C., 285° C., 285° C., 280° C., 280° C. and 280° C., respectively. The alkali-soluble chips flow through the first heating zone, the second heating zone, the third heating zone, the fourth heating zone, the fifth heating zone and the sixth heating zone as a result of being driven by the screw, during which the alkali-soluble chips are melted, the wall material of the foaming microcapsule is melted, and the alkane foaming agent is foamed. Under the extrusion of the screw, the alkali-soluble chips form a melt having closed and dispersed microbubbles, which forms an alkali-soluble polyester fiber having a microporous structure at a spinning speed of 1000-3500 m/min and a draft ratio of 3.0-3.8; the microporous alkali-soluble polyester fibers can be short fibers, filaments or fiber strips;

d. Preparation of hollow textiles:

d1. The core-spun yarn of short-staple wrapped microporous alkali-soluble polyester filament is prepared according to the method of core-spun yarn spinning (as shown in FIG. 1). The wrapping of the core-spun yarn is natural short fiber or chemical short fiber, and the core of the core-spun yarn is the microporous alkali-soluble polyester filament. The spinning method for the above core-spun yarn is ring spinning, siro spinning, friction spinning or vortex spinning;

d2. The core-spun yarn of short-staple wrapped microporous alkali-soluble polyester filament is put into the NaOH solution for alkali dissolution treatment. The NaOH solution contacts and dissolves the microporous alkali-soluble polyester filament, and the microporous structure of the microporous alkali-soluble polyester filament increases the contact area. After dissolution of the microporous alkali-soluble polyester filament, the core-spun yarn of short-staple wrapped microporous alkali-soluble polyester filament forms a hollow yarn with a complete hollow structure, and the hollow yarn is woven into a cloth to achieve hollow textile preparation.

Alternatively, the core-spun yarn of short-staple wrapped microporous alkali-soluble polyester filament can be first woven into a cloth to obtain a core-spun yarn fabric, which is then put into the NaOH solution for alkali dissolution treatment. The NaOH solution contacts and dissolves the microporous alkali-soluble polyester filament, and the microporous structure of the microporous alkali-soluble polyester filament increases the contact area. After the dissolution of the microporous alkali-soluble polyester filament, the core-spun yarn fabric forms a hollow spun fabric to achieve hollow textile preparation.

It is further noted that during the dissolution of the microporous alkali-soluble polyester filaments in the alkaline solution, the microporous alkali-soluble polyesters are first hydrolyzed in the alkali solution under the action of alkali, wherein the —OH group acts as a catalyst, the ester bonds are hydrolyzed, the fibers are dissolved, and the disodium terephthalate and ethylene glycol are generated. Due to that the microporous alkali-soluble polyester filament forms a porous structure during the spinning, the microporous structure of the alkali-soluble polyester filament can improve the efficiency of the alkali dissolution to improve the solubility of the polyester filament. Further, the dissolution process of the microporous alkali-soluble polyester filament is a thorough chemical reaction dissolution. The alkali dissolution conditions of the microporous alkali-soluble polyester filament is further related to the alkali concentration, temperature and time, and different dissolution conditions apply to different application fields and production equipment.

Embodiment 1

The present invention will be specifically described with reference to the microporous alkali-soluble FDY filament as follows:

1. Preparation of foaming microcapsules:

11. Dimethyl terephthalate, ethylene glycol, sodium dimethyl isophthalate-5-sulfonate, polyethylene glycol and tetrabutyl titanate are placed in a pulp vessel and mixed well to obtain a raw material for a microcapsule wall material, wherein the parts by weight of the dimethyl terephthalate, the ethylene glycol, the sodium dimethyl isophthalate-5-sulfonate, the polyethylene glycol and tetrabutyl titanate are:

Dimethyl terephthalate, 70%;

Ethylene glycol, 15%;

Sodium dimethyl isophthalate-5-sulfonate, 10%;

Polyethylene glycol, 4.3%;

Tetrabutyl titanate, 0.7%;

12. The raw material for the microcapsule wall after the mixing in 11 is transferred into an esterification vessel for esterification reaction at a temperature of 260° C. for 2 hours;

13. The raw material for the microcapsule wall after the esterification reaction in 12 is transferred into a polycondensation vessel for polycondensation reaction at a temperature of 280° C. for 2 hours; the degree of vacuum inside the polycondensation vessel during the polycondensation reaction is 50 pa;

14. The raw material for the microcapsule wall after the polycondensation reaction in 13 is fed into a granulator to produce microcapsule wall chips with a melting point of 258° C. and an intrinsic viscosity of 0.70;

15. An alkane foaming agent is selected as the core material of the microcapsule, which, together with the microcapsule wall chips obtained in 14, is used to prepare the foaming microcapsule through in-situ polymerization; the foaming microcapsule has a particle size of 10 μm, and the parts by weight of the wall and core materials of the microcapsule are:

Wall material of the microcapsule, 80%;

Core material of the microcapsule, 20%;

2. Preparation of alkali-soluble chips containing foaming microcapsules:

21. Dimethyl terephthalate, ethylene glycol, sodium dimethyl isophthalate-5-sulfonate, diethylene glycol and tetrabutyl titanate are placed in a pulp vessel and mixed well to obtain a raw material for the alkali-soluble chips, wherein the parts by weight of the dimethyl terephthalate, the ethylene glycol, the sodium dimethyl isophthalate-5-sulfonate, the diethylene glycol and the tetrabutyl titanate are:

Dimethyl terephthalate, 60%;

Ethylene glycol, 20%;

Sodium dimethyl isophthalate-5-sulfonate, 14%;

Diethylene glycol, 5%;

Tetrabutyl titanate, 1%;

22. The raw material for the alkali-soluble chips after the mixing in 21 is transferred into an esterification vessel for esterification reaction at a temperature of 250° C. for 2 hours;

23. The raw material for the alkali-soluble chips after the esterification reaction in 22 is transferred into a polycondensation vessel for polycondensation reaction at a temperature of 280° C. for 2 hours; the degree of vacuum inside the polycondensation vessel during the polycondensation reaction is 50 pa;

24. After the polycondensation reaction, the vacuum is removed to allow the pressure inside the polycondensation vessel to be equal to the atmospheric pressure, and the raw material for the alkali-soluble chips is cooled to 240° C.; the foaming microcapsules are then added to the polycondensation vessel and mixed uniformly with the raw material for the alkali-soluble chips; the parts by weight of the raw material for the alkali-soluble chips and the foaming micro-capsule are:

Raw material for the alkali-soluble chips, 95%;

Foaming microcapsules, 5%;

25. The raw material for the alkali-soluble chips containing foaming microcapsules and mixed uniformly in the polycondensation vessel is fed into a granulator to produce alkali-soluble chips containing foaming microcapsules and having a melting point of 220° C. and an intrinsic viscosity of 0.58;

3. Melt foaming and spinning:

31. The alkali-soluble chips containing foaming micro-capsules are fed into a dryer to be subjected to pre-crystallization and drying processes in sequence for pre-crystallization and drying treatment, after which the water content of the alkali-soluble chips is required to be less than 20 ppm; the temperature and time for the pre-crystallization process are 130° C. and 30 minutes, respectively, and the temperature and time for the drying process are 130° C. and 12 hours, respectively;

32. The alkali-soluble chips after the pre-crystallization and drying treatment in 31 are transferred into a screw extruder for spinning. A melt barrel of the screw extruder is provided with a first heating zone, a second heating zone, a third heating zone, a fourth heating zone, a fifth heating zone, and a sixth heating zone arranged in this order along an extrusion direction, with temperature at each heating zone being 275° C., 285° C., 285° C., 280° C., 280° C. and 280° C., respectively. The alkali-soluble chips flow through the first heating zone, the second heating zone, the third heating zone, the fourth heating zone, the fifth heating zone and the sixth heating zone as a result of being driven by the screw, during which the alkali-soluble chips are melted, the wall material of the foaming microcapsule is melted, and the alkane foaming agent is foamed. Under the extrusion of the screw, the alkali-soluble chips form a melt having closed and dispersed microbubbles, which forms an alkali-soluble 50 D/24F FDY filament having a microporous structure at a spinning speed of 3500 m/min and a draft ratio of 3.5. A solubility comparison between the microporous and ordinary alkali-soluble FDY filaments is as follows:

| | Specification | Strength | Elongation at break (%) | Dissolution time (NaOH solution concentration: 5 g/l; temperature: 100° C.; bath ratio: 1:20) |
|---|---|---|---|---|
| Ordinary alkali-soluble fiber | 50 d/24 F(FDY) | 3.5 cn/dtex | 31 | 50 min |
| Microporous alkali-soluble fiber | 50 d/24 F(FDY) | 2.8 cn/dtex | 25 | 10 min |

Embodiment 2

The alkali-soluble 30 D/36F filaments with a microporous structure are prepared according to the process steps and process parameters of embodiment 1, and cotton fibers are wrapped around the microporous alkali-soluble filaments through ring spinning to obtain a core-spun yarn of cotton fiber wrapped microporous alkali-soluble filaments. The core-spun yarn has a specification of 40 s/2 and a twist factor of 320. The core-spun yarn is then put into the 3 g/l NaOH solution for dissolution for 60 minutes at a temperature of 105° C. to obtain the cotton fiber hollow yarn. A comparison of the core-spun yarn of cotton fiber wrapped microporous alkali-soluble filaments before and after the dissolution is as follows:

| | Before dissolution | After dissolution |
|---|---|---|
| Yarn Count (Ne) | 40 s/2 | 51 s/2 |
| Strength | 16.5 cn/dtex | 13 cn/dtex |
| Exterior diameter | same | |

It is further noted that the hollow yarns of the embodiment 2 can be used directly for woven or ready-made yarns, or pre-treated and dyed for use in yarn-dyed textiles.

Embodiment 3

The alkali-soluble 50 D/36F filaments with a microporous structure are prepared according to the process steps and process parameters of embodiment 1, and cotton fibers are wrapped around the microporous alkali-soluble filaments through siro spinning to obtain a core-spun yarn of cotton fiber wrapped microporous alkali-soluble filaments. The core-spun yarn has a specification of 32 s and a twist multiple factor of 320. The core-spun yarn is then knitted into a single jersey fabric through a circular knitting machine, and finally the single jersey fabric is put into the 2 g/l NaOH solution for dissolution for 40 minutes at a temperature of 105° C.; the hollow fabric can be obtained after dissolution, dyeing and post-treatment processes. A comparison of the single jersey fabric before and after the dissolution is as follows:

| | Before dissolution | After dissolution |
|---|---|---|
| Yarn Count (Ne) | 32 s | 40 s |
| Fabric gram weight | 160 g/m2 | 135 g/m2 |
| Fabric external thickness | same | |

Embodiment 4

The alkali-soluble 100 D/36F filaments with a microporous structure are prepared according to the process steps and process parameters of embodiment 1, and cotton fibers are wrapped around the microporous alkali-soluble filaments through ring spinning to obtain a core-spun yarn of cotton fiber wrapped microporous alkali-soluble filaments. The core-spun yarn has a specification of 16 s and a twist multiple factor of 360. The core-spun yarn is used as a terry yarn, and the 32 s/2 ordinary cotton yarn is used as the ground weave yarn of the towel, which will be woven to a blank towel through a shuttle loom.

The greige towel is put into the 2 g/l NaOH solution for dissolution for 50 minutes at a temperature of 95° C. The hollow towel with a hollow terry can be obtained after dissolution, dyeing and post-treatment processes. A comparison of the fabric before and after the dissolution is as follows:

| | Before dissolution | After dissolution |
|---|---|---|
| Loop yarn Count | 16 s | 23 s |
| Towel gram weight | 670 g/pcs | 580 g/pcs |
| Towel external thickness | same | |

The above are only preferred embodiments of the invention, and modification may be made to the specific implementation ways and application scope by the skilled in the art based on the idea of the invention. The contents of the description should not be interpreted as limiting the invention.

What is claimed is:

1. A method for preparing a hollow textile, characterized by comprising the following process steps:

a. preparing foaming microcapsules:

a1. mixing dimethyl terephthalate, ethylene glycol, sodium dimethyl isophthalate-5-sulfonate, polyethylene glycol and tetrabutyl titanate in a pulp vessel to obtain a raw material for a microcapsule wall material, wherein weight percentages of the dimethyl terephthalate, the ethylene glycol, the sodium dimethyl isophthalate-5-sulfonate, the polyethylene glycol and tetrabutyl titanate are:

Dimethyl terephthalate, 60%-75%;

Ethylene glycol, 5%-15%;

Sodium dimethyl isophthalate-5-sulfonate, 2%-15%;

Polyethylene glycol, 2%-10%;

Tetrabutyl titanate, 0.4%-1.3%;

a2. transferring the raw material for the microcapsule wall material obtained in a1 into an esterification vessel for esterification reaction at a temperature of 220° C.-260° C. for 2-3 hours;

a3. transferring the raw material for the microcapsule wall material after the esterification reaction in a2 into a polycondensation vessel for polycondensation reaction at a temperature of 250° C.-280° C. for 1-2 hours; a degree of vacuum inside the polycondensation vessel during the polycondensation reaction is 30 pa-80 pa;

a4. feeding the raw material for the microcapsule wall material after the polycondensation reaction in a3 into a granulator to produce microcapsule wall chips with a melting point of 250° C.-258° C.;

a5. selecting an alkane foaming agent as a core material of the foaming microcapsules, and then preparing the foaming microcapsules through in-situ polymerization by using the core material and the microcapsule wall chips obtained in a4; wherein each foaming microcapsule has a particle size of 5 μm-15 μm, and weight percentages of a wall material made by the microcapsule wall chips and the core material of each foaming microcapsule are:

Wall material of the foaming microcapsule, 80%-85%;

Core material of the foaming microcapsule, 15%-20%;

b. preparing alkali-soluble chips containing the foaming microcapsules:

b1. mixing dimethyl terephthalate, ethylene glycol, sodium dimethyl isophthalate-5-sulfonate, diethylene glycol and tetrabutyl titanate in a pulp vessel to obtain a raw material for the alkali-soluble chips, wherein weight percentages of the dimethyl terephthalate, the ethylene glycol, the sodium dimethyl isophthalate-5-sulfonate, the diethylene glycol and the tetrabutyl titanate are:

Dimethyl terephthalate, 50%-65%;

Ethylene glycol, 15%-25%;

Sodium dimethyl isophthalate-5-sulfonate, 5%-20%;

Diethylene glycol, 2%-10%;

Tetrabutyl titanate, 0.5%-1.2%;

b2. transferring the raw material for the alkali-soluble chips obtained in b1 into an esterification vessel for esterification reaction at a temperature of 200° C.-260° C. for 2-3 hours;

b3. transferring the raw material for the alkali-soluble chips after the esterification reaction in b2 into a polycondensation vessel for polycondensation reaction at a temperature of 250° C.-280° C. for 1-2 hours; degree of vacuum inside the polycondensation vessel during the polycondensation reaction is 30 pa-80 pa;

b4. After the polycondensation reaction, removing the vacuum inside the polycondensation vessel to allow pressure inside the polycondensation vessel to be equal to atmospheric pressure, and cooling the raw material for the alkali-soluble chips is cooled to 220° C.-240° C.; then adding the foaming microcapsules prepared in a5 to the polycondensation vessel and mixing the foaming microcapsules prepared in a5 uniformly with the raw material for the alkali-soluble chips, wherein the added foaming microcapsules are 1%-10% by weight of the raw material for the alkali-soluble chips;

b5. feeding the raw material for the alkali-soluble chips containing the foaming microcapsules into another granulator to produce the alkali-soluble chips containing the foaming microcapsules and having a melting point of 220° C.;

c. Melt foaming and spinning:

c1. feeding the alkali-soluble chips containing the foaming microcapsules into a dryer for pre-crystallization and drying processes in sequence for pre-crystallization and drying treatment, after which water content of the alkali-soluble chips is required to be less than 50 ppm; temperature and time for the pre-crystallization process are 110° C.-130° C. and 10-30 minutes, respectively, and temperature and time for the drying processes are 120° C.-150° C. and 10-15 hours, respectively;

c2. transferring the alkali-soluble chips after the pre-crystallization and drying treatment into a screw extruder for spinning, wherein a melt barrel of the screw extruder is provided with a first heating zone, a second heating zone, a third heating zone, a fourth heating zone, a fifth heating zone, and a sixth heating zone arranged sequentially along an extrusion direction, with temperatures of the first heating zone, the second heating zone, the third heating zone, the fourth heating zone, the fifth heating zone and the sixth heating zone being 275° C., 285° C., 285° C., 280° C., 280° C. and 280° C., respectively; driving the alkali-soluble chips to flow through the first heating zone, the second heating zone, the third heating zone, the fourth heating zone, the fifth heating zone and the sixth heating zone by a screw, during which the alkali-soluble chips are melted, the wall material of the foaming microcapsules is melted, and the alkane foaming agent is foamed; under extrusion of the screw, the alkali-soluble chips form a melted substance having closed and dispersed microbubbles, the melted substance forms an alkali-soluble polyester filament having a microporous structure at a spinning speed of 1000-3500 m/min and a draft ratio of 3.0-3.8;

d. preparing the hollow textile:

d1. producing core-spun yarn by core-spun yarn spinning, wherein the core-spun yarn has the alkali-soluble polyester filament having a microporous structure as a core, and natural short fiber or chemical short fiber as a wrapping; the core-spun yarn spinning is ring spinning, siro spinning, friction spinning or vortex spinning;

d2. placing the core-spun yarn into NaOH solution for alkali dissolution treatment, wherein the NaOH solution contacts and dissolves the alkali-soluble polyester filament, and the microporous structure of the alkali-soluble polyester filament increases contact area with the NaOH solution; after the alkali dissolution treatment, the core-spun yarn forms a hollow yarn with a complete hollow structure, and the hollow yarn is woven into a cloth to obtain the hollow textile;

alternatively, weaving the core-spun yarn into a cloth to obtain a core-spun yarn fabric, and then placing the core-spun yarn fabric into the NaOH solution for alkali dissolution treatment, wherein the NaOH solution contacts and dissolves the alkali-soluble polyester filament, and the microporous structure of the alkali-soluble polyester filament increases contact area with the NaOH solution; after the alkali dissolution treatment the core-spun yarn fabric forms a hollow spun fabric to obtain the hollow textile.

2. The method for preparing the hollow textile according to claim 1, characterized in that the alkane foaming agent is butane, isobutane or pentane.

3. The method for preparing the hollow textile according to claim 1, characterized in that the microcapsule wall chips obtained in a4 have an intrinsic viscosity of 0.65-0.75.

4. The method for preparing the hollow textile according to claim 1, characterized in that the alkali-soluble chips containing the foaming microcapsules obtained in b5 have an intrinsic viscosity of 0.55-0.65.

5. The method for preparing the hollow textile according to claim 1, characterized in that the alkali-soluble polyester filament having the microporous structure obtained in c2 has a fiber strength of 2.5-3.5 cn/dtex, and an elongation at break of 20%-40%.

6. The method for preparing the hollow textile according to claim 1, characterized in that:

In a1, the weight percentages of the dimethyl terephthalate, the ethylene glycol, the sodium dimethyl isophthalate-5-sulfonate, the polyethylene glycol and the tetrabutyl titanate in the raw material for the microcapsule wall material are:

Dimethyl terephthalate, 70%;

Ethylene glycol, 15%;

Sodium dimethyl isophthalate-5-sulfonate, 10%;

Polyethylene glycol, 4.3%;

Tetrabutyl titanate, 0.7%;

In a2, the esterification reaction is carried out at a temperature of 260° C. for 2 hours;

In a3, the polycondensation reaction is carried out at a temperature of 280° C. for 2 hours; the degree of vacuum inside the polycondensation vessel during the polycondensation reaction is 50 pa;

In a4, the microcapsule wall chips have a melting point of 258° C., and an intrinsic viscosity of 0.70;

In a5, isobutane is selected as the core material of the foaming microcapsules;

each foaming microcapsule has a particle size of 10 μm, and the weight percentages of the wall material made by the microcapsule wall chips and the core material of each foaming microcapsule are:

Wall material of the foaming microcapsule, 80%;

Core material of the foaming microcapsule, 20%.

7. The method for preparing the hollow textile according to claim 1, characterized in that:

in b1, the weight percentages of the dimethyl terephthalate, the ethylene glycol, the sodium dimethyl isophthalate-5-sulfonate, the diethylene glycol and the tetrabutyl titanate in the raw material for the alkali-soluble chips are:

Dimethyl terephthalate, 60%;

Ethylene glycol, 20%;

Sodium dimethyl isophthalate-5-sulfonate, 14%;

Diethylene glycol, 5%;

Tetrabutyl titanate, 1%;

In b2, the esterification reaction is carried out at a temperature of 250° C. for 2 hours;

In b3, the polycondensation reaction is carried out at a temperature of 280 for 2 hours; the degree of vacuum inside the polycondensation vessel during the polycondensation reaction is 50 pa;

In b4, after the polycondensation reaction, removing the vacuum inside the polycondensation vessel to allow the pressure inside the polycondensation vessel to be equal to the atmospheric pressure, and cooling the raw material for the alkali-soluble chips to 240° C.; then adding the foaming microcapsules to the polycondensation vessel and mixing the foaming microcapsules uniformly with the raw material for the alkali-soluble chips; weight percentages of the raw material for the alkali-soluble chips and the foaming microcapsules are:

Raw material for the alkali-soluble chips, 95%;

Foaming microcapsules, 5%;

In b5, the alkali-soluble chips have a melting point of 220° C., and an intrinsic viscosity of 0.58.

8. The method for preparing the hollow textile according to claim 1, characterized in that:

In c1, the water content of the alkali-soluble chips after the pre-crystallization and drying treatment is required to be less than 20 ppm; the temperature and time for the pre-crystallization process are 130° C. and 30 minutes, respectively, and the temperature and time for the drying processes are 130° C. and 12 hours, respectively;

In c2, the melted substance having closed and dispersed microbubbles forms the alkali-soluble polyester filament having the microporous structure at a spinning speed of 3500 m/min and a draft ratio of 3.5; the alkali-soluble polyester filament is a 50 D/24F FDY filament with a fiber strength of 2.8 cn/dtex, and an elongation at break of 25%.

* * * * *